(12) United States Patent
Takamura et al.

(10) Patent No.: US 8,989,936 B2
(45) Date of Patent: Mar. 24, 2015

(54) HYBRID VEHICLE CONTROL SYSTEM

(75) Inventors: Yutaka Takamura, Yokohama (JP); Yoshinori Yamamura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 63 days.

(21) Appl. No.: 13/879,768

(22) PCT Filed: Oct. 18, 2011

(86) PCT No.: PCT/JP2011/073915
§ 371 (c)(1),
(2), (4) Date: Jun. 11, 2013

(87) PCT Pub. No.: WO2012/053508
PCT Pub. Date: Apr. 26, 2012

(65) Prior Publication Data
US 2013/0297127 A1    Nov. 7, 2013

(30) Foreign Application Priority Data

Oct. 19, 2010   (JP) .................. 2010-234425

(51) Int. Cl.
*B60W 10/08*    (2006.01)
*B60K 6/48*     (2007.10)
(Continued)

(52) U.S. Cl.
CPC ............ *B60W 20/108* (2013.01); *B60K 6/48* (2013.01); *B60L 3/04* (2013.01); *B60L 11/14* (2013.01); *B60W 10/02* (2013.01); *B60W 10/06* (2013.01); *B60W 10/08* (2013.01); *B60W 20/00* (2013.01);
(Continued)

(58) Field of Classification Search
CPC ......... B60K 6/48; B60K 6/485; B60W 10/02; B60W 10/06; B60W 10/08; B60W 20/00; B60W 20/108; B60W 2710/028; B60W 2710/0644; B60W 2710/081; B60L 11/14; B60L 2240/423; B60L 2240/507; B60L 2240/421; B60L 2240/441; Y02T 10/6221; Y02T 10/6286; Y02T 10/642; B60Y 2200/92
See application file for complete search history.

(56) References Cited

U.S. PATENT DOCUMENTS

| | | | |
|---|---|---|---|
| 2004/0030470 A1* | 2/2004 | De La Salle et al. | ........... 701/22 |
| 2007/0056783 A1 | 3/2007 | Joe et al. | |

(Continued)

FOREIGN PATENT DOCUMENTS

| | | | |
|---|---|---|---|
| JP | 2000-297668 A | | 10/2000 |
| JP | 2003-237383 | * | 8/2003 |

(Continued)

*Primary Examiner* — Michael J Zanelli
(74) *Attorney, Agent, or Firm* — Global IP Counselors, LLP

(57) ABSTRACT

A hybrid vehicle control system includes an engine, a motor/generator, a start clutch and a controller. The motor/generator is connected to the engine to carry out power driving and electric power regeneration. The start clutch is arranged in a driving force transmission path from the motor/generator to a drive wheel, and is engaged under an input rotational speed control. The controller includes a transient control mode switching section that when the input rotational speed control of the start clutch is switched from motor rotational speed control to engine rotational speed control, the motor rotational speed control is maintained on and both the motor rotational speed control and the engine rotational speed control are simultaneously carried out until determining engine torque is stable, and, after determining that the engine torque is stable, the control is switched from the motor rotational speed control to a motor torque control.

14 Claims, 9 Drawing Sheets

(51) Int. Cl.
*B60K 6/54* (2007.10)
*B60L 11/14* (2006.01)
*B60W 10/06* (2006.01)
*B60W 20/00* (2006.01)
*B60L 3/04* (2006.01)
*B60W 10/02* (2006.01)
*B60W 30/192* (2012.01)
*B60L 7/14* (2006.01)
*B60L 7/18* (2006.01)
*B60L 15/20* (2006.01)

(52) U.S. Cl.
CPC ............... B60W 30/192 (2013.01); B60L 7/14 (2013.01); B60L 7/18 (2013.01); B60L 15/2009 (2013.01); *B60L 2210/30* (2013.01); *B60L 2210/40* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60W 2710/028* (2013.01); *B60W 2710/0644* (2013.01); *B60W 2710/081* (2013.01); *B60Y 2200/92* (2013.01); *Y02T 10/6221* (2013.01); *Y02T 10/6286* (2013.01); *Y02T 10/642* (2013.01); *Y02T 10/7077* (2013.01); *Y02T 10/7241* (2013.01); *B60L 2240/12* (2013.01); *B60L 2240/486* (2013.01); *B60L 2240/507* (2013.01); *B60W 2600/00* (2013.01)
USPC ................ 701/22; 180/65.28; 180/65.285; 180/65.25

(56) References Cited

U.S. PATENT DOCUMENTS

| 2007/0227790 | A1* | 10/2007 | Tanishima | 180/65.2 |
| 2010/0304923 | A1* | 12/2010 | Schenk et al. | 477/5 |
| 2012/0271498 | A1* | 10/2012 | Kobayashi | 701/22 |

FOREIGN PATENT DOCUMENTS

| JP | 2006-54936 | * | 2/2006 |
| JP | 2010-083417 | A | 4/2010 |
| WO | WO2011/125775 | A1 * | 10/2011 |

* cited by examiner

HYBRID VEHICLE CONTROL SYSTEM

CROSS-REFERENCE TO RELATED APPLICATIONS

This application is a U.S. National stage of International Application No. PCT/JP2011/073915, filed Oct. 18, 2011. This application claims priority to Japanese Patent Application No. 2010-234425, filed on Oct. 19, 2010.

BACKGROUND

1. Field of the Invention

The present invention relates to a hybrid vehicle control device that switches the input rotational speed control of the start clutch from the motor rotational speed control to the engine rotational speed control.

2. Background Information

In the prior art, there is a hybrid vehicle control device that works as follows: the torque capacity basic target value of the start clutch corresponding to the driving torque target value is calculated, and the motor is controlled for rotational speed, while the torque capacity command value of the start clutch is corrected corresponding to the deviation between the motor torque and the torque basic capacity target value, so that the start clutch is controlled (for example, see Japanese Laid Open Patent Application No. 2010-83417).

SUMMARY

For the conventional hybrid vehicle control device, when the output of the motor and the battery are restricted, the motor rotational speed control cannot be continued. Consequently, carrying out the engine rotational speed control is necessary. However, the ignition timing is switched at the conventional engine torque control and the engine rotational speed control, so that, when a transient engine torque is not output and the motor power generation is carried out, etc., the engine rotational speed (equal to the input rotational speed of the start clutch) decreases. This is undesirable.

The purpose of the present invention is to solve the problem by providing a hybrid vehicle control device with the following feature: when the input rotational speed control of the start clutch is switched from the motor rotational speed control to the engine rotational speed control, a variation in the clutch input rotational speed is suppressed, while the motor power generation can be realized in the allowed range.

In order to realize the purpose described above, the hybrid vehicle control device of the present invention has the following means: an engine, a motor/generator, a start clutch, and a transient control mode switching means. The motor/generator is connected to the engine described above and carries out power driving and electric power regeneration. The start clutch is arranged in the driving force transmission system from the motor/generator to the drive wheels, and the start clutch is engaged under the input rotational speed control. The transient control mode switching means works as follows: when the input rotational speed control of the start clutch is switched from the motor rotational speed control to the engine rotational speed control, the motor rotational speed control is maintained, and both the motor rotational speed control and the engine rotational speed control are carried out at the same time until a determination has been made that the engine torque is stable; after the determination has been made that the engine torque is stable, the control is switched from the motor rotational speed control to the motor torque control.

Consequently, when the input rotational speed control of the start clutch is switched from the motor rotational speed control to the engine rotational speed control, in the transient control mode switching means, the motor rotational speed control is maintained, and both the motor rotational speed control and the engine rotational speed control are carried out at the same time until a determination has been made that the engine torque is stable; after the determination has been made that the engine torque is stable, the control is switched from the motor rotational speed control to the motor torque control. That is, when the switch is made from the motor rotational speed control to the engine rotational speed control, in the switching start zone, the motor rotational speed control and the engine rotational speed control are carried out simultaneously. As a result, when the engine is switched from the torque control to the rotational speed control, the so-called engine transient response without the generation of the transient engine torque is compensated by the motor rotational speed control that maintains the target rotational speed while generating the motor torque so as to suppress the variation in the engine torque. As a result, when the input rotational speed control of the start clutch is switched from the motor rotational speed control to the engine rotational speed control, it is possible to suppress a variation in the clutch input rotational speed while realizing motor electric power generation in the allowed range after switching to the motor torque control.

BRIEF DESCRIPTIONS OF THE DRAWINGS

Figure 14:
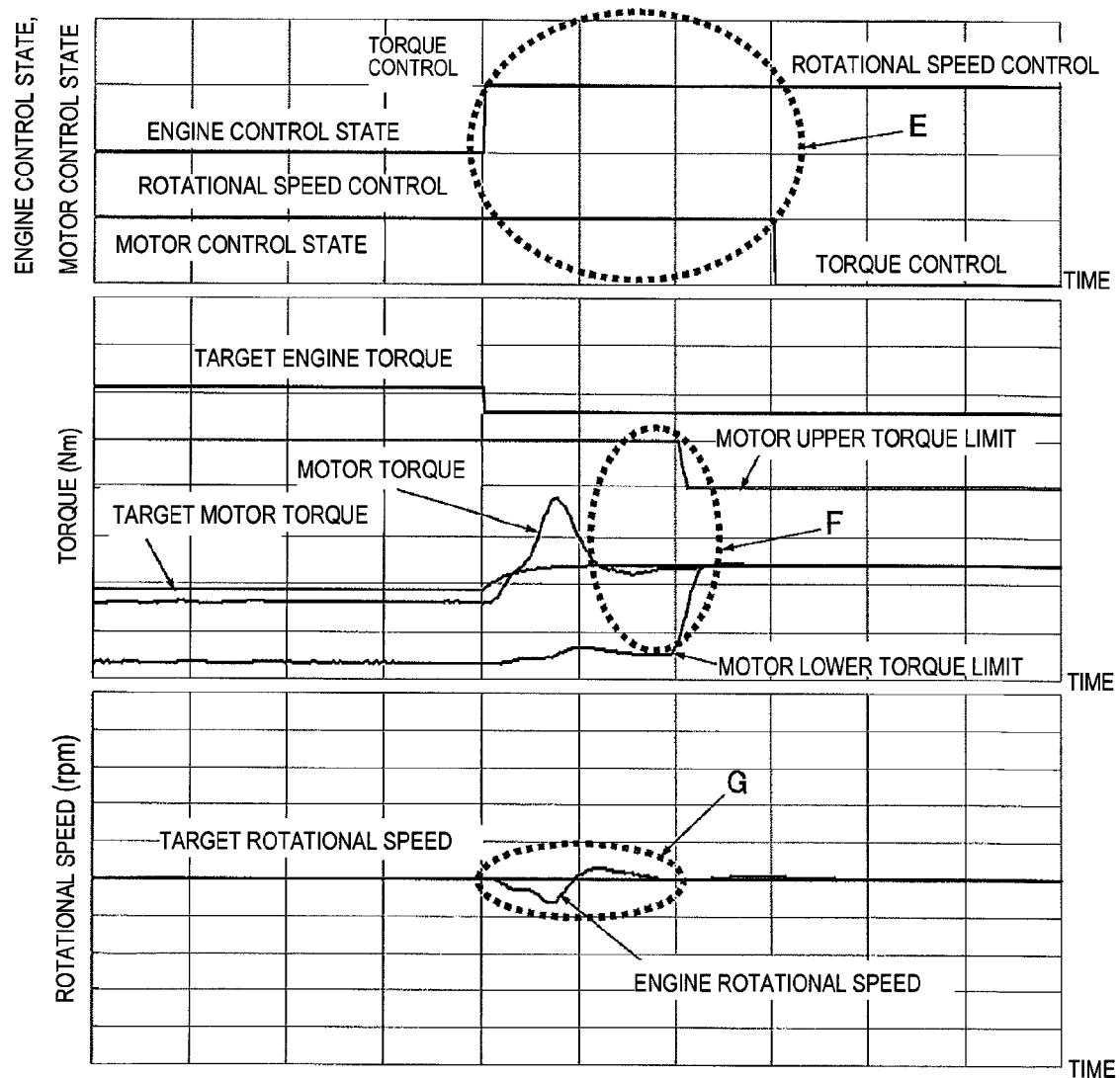

FIG. 14 is a time chart illustrating the various characteristics of the engine control state, the motor control state, the target engine torque, the target motor torque, the motor torque, the motor upper torque limit, the motor lower torque limit, the target rotational speed, and the engine rotational speed when the switch is made from the motor rotational speed control to the engine rotational speed control in one embodiment of the present invention.

DETAILED DESCRIPTION OF THE EMBODIMENTS

In the following, the optimum embodiment for realizing the hybrid vehicle control device in the present invention will be explained with reference to one embodiment of the present invention illustrated in the drawings.

Embodiment 1

Figure 1:
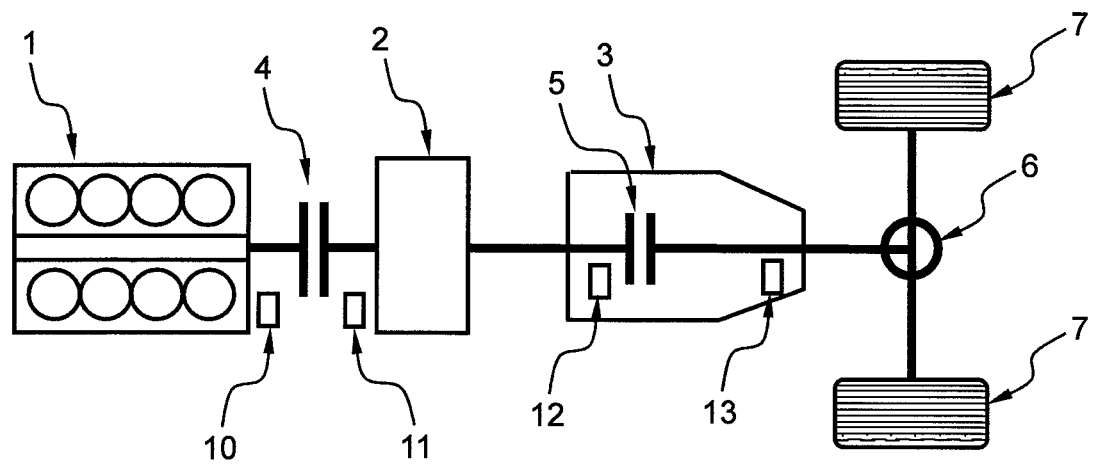
FIG. 1 is a schematic plan view showing a power train system of a hybrid vehicle in which a hybrid vehicle control device in accordance with one embodiment of the present invention can be applied.

First, the configuration will be explained. FIG. 1 is a power train system diagram illustrating the configuration of the power train system of the hybrid vehicle where the control system of one embodiment of the present invention can be applied. In the following, the configuration of the power train system will be explained with reference to FIG. 1.

As shown in FIG. 1, the power train system of the hybrid vehicle in one embodiment of the present invention comprises an engine 1, a motor/generator 2, an automatic transmission 3, a first clutch 4, a second clutch 5 (the start clutch), a differential gear unit 6, and a pair of wheels 7 and 7 (the drive wheels).

The hybrid vehicle in one embodiment of the present invention has a power train system configuration comprising an engine, one motor and two clutches. The running modes include the "HEV mode" due to the engagement of the first clutch 4, the "EV mode" due to the disengagement of the first clutch 4, and the "WSC mode" of running when the second clutch 5 is in the slip engagement state.

For the engine 1 described above, the output shaft and the input shaft of the motor/generator 2 (abbreviated as MG) are connected to each other via the first variable torque capacity clutch 4 (abbreviated as CL1).

The output shaft of the motor/generator 2 is connected to the input shaft of the automatic transmission 3 (abbreviated as AT).

The output shaft of the automatic transmission 3 is connected via the differential gear unit 6 to the wheels 7 and 7.

The second clutch 4 (abbreviated as CL2) uses one of the engagement elements of the torque capacity variable clutch/brake that carries out power transmission in the transmission unit in different states corresponding to the shift states of the automatic transmission 3. As a result, the automatic transmission 3 synthesizes the power of the engine 1 input via the first clutch 4 and the power input from the motor/generator 2 and outputs the synthesized power to the wheels 7 and 7.

For example, the first clutch 4 and the second clutch 5 can be made of the wet-type clutches that allow for continuous control of the hydraulic fluid flow rate and the hydraulic pressure by means of a proportional solenoid. The power train system has two operation modes corresponding to the connection states of the first clutch 4. In the disengaged state of the first clutch 4, the power train system is in the "EV mode" when the vehicle runs with only the power of the motor/generator 2; in the engaged state of the first clutch 4, the power train system is in the "HEV mode" when the vehicle runs with both the power of the engine 1 and the power of the motor/generator 2.

Arranged in the power train system are the following parts: an engine rotational speed sensor 10 that detects the rotational speed of the engine 1, an MG rotational speed sensor 11 that detects the rotational speed of the motor/generator 2, an AT input rotational speed sensor 12 that detects the input shaft rotational speed of the automatic transmission 3, and an AT output rotational speed sensor 13 that detects the output shaft rotational speed of the automatic transmission 3.

Figure 2:
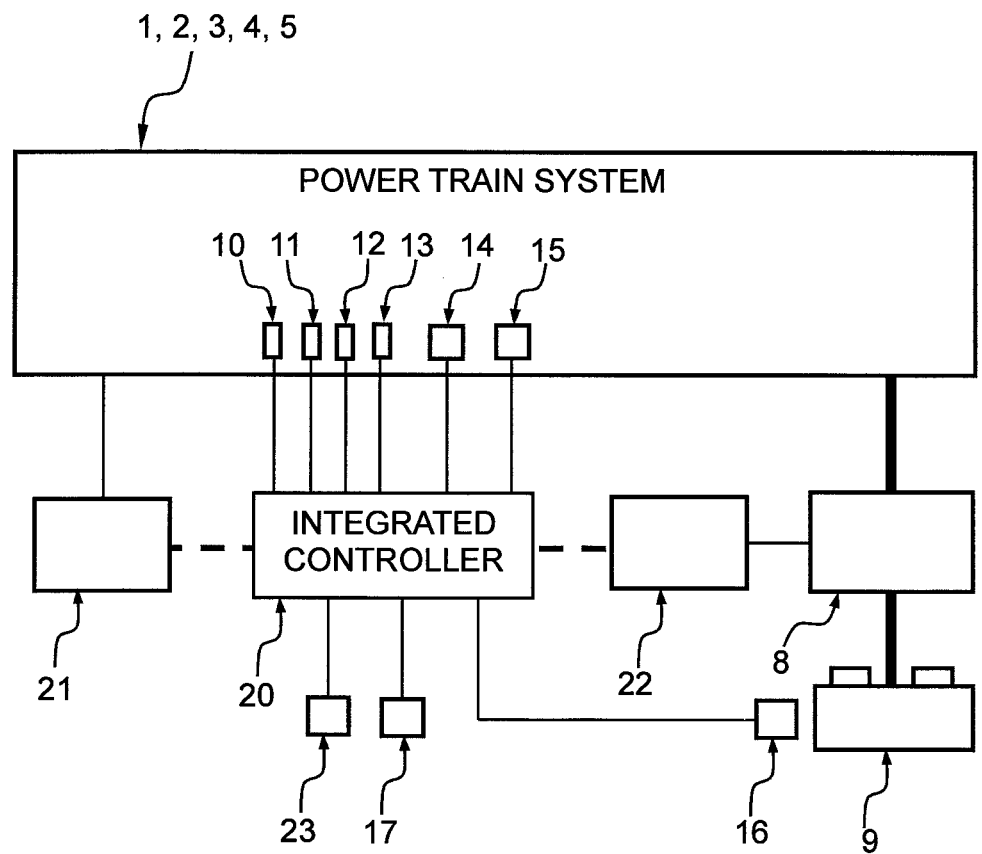
FIG. 2 is a block diagram illustrating the hybrid vehicle control device in which the controller of one embodiment of the present invention can be applied.

FIG. 2 is a diagram illustrating the control system of the hybrid vehicle wherein the controller of one embodiment of the present invention is utilized. In the following, the configuration of the control system will be explained with reference to FIG. 2.

As shown in FIG. 2, the control system in one embodiment of the present invention comprises an integrated controller 20, an engine controller 21, a motor controller 22, an inverter 8, a battery 9, a solenoid valve 14, a solenoid valve 15, an accelerator pedal position sensor 17, a brake hydraulic pressure sensor 23, and a SOC sensor 16.

The integrated controller 20 maintains integrated control for the operating points of the structural elements of the power train system. Corresponding to the accelerator position opening APO, the state of charge SOC, and the vehicle speed VSP (proportional to the rotational speed of the output shaft of the automatic transmission), the integrated controller 20 selects the running mode that can realize the drive torque desired by the driver. Then, the target MG torque or the target MG rotational speed is transmitted to the motor controller 22; the target engine torque is transmitted to the engine controller 21, and the driving signal is transmitted to the solenoid valves 14 and 15.

The engine controller 21 controls the engine 1. The motor controller 22 controls the motor/generator 2. The inverter 8 drives the motor/generator 2. The battery 9 stores the electric energy. The solenoid valve 14 controls the hydraulic pressure of the first clutch 4. The solenoid valve 15 controls the hydraulic pressure of the second clutch 5. The accelerator pedal position sensor 17 detects the accelerator position opening (APO). The brake hydraulic pressure sensor 23 detects the brake hydraulic pressure (BPS). The SOC sensor 16 detects the state of charge of the battery 9.

Figure 3:
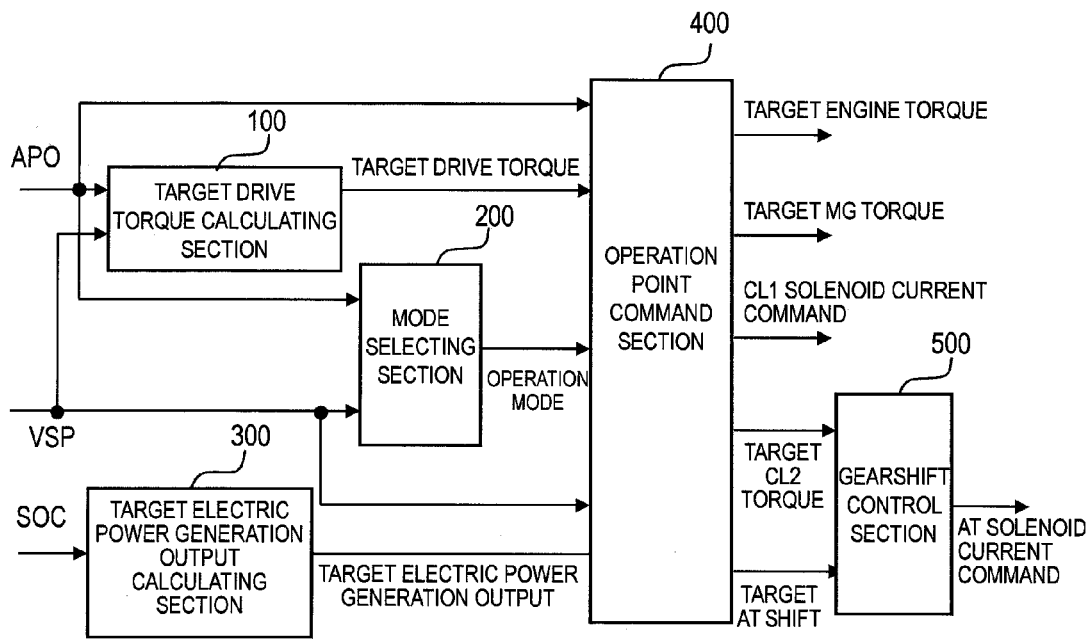
FIG. 3 is a block diagram illustrating the operation of the integrated controller in one embodiment of the present invention.

FIG. 3 is a block diagram illustrating the control process of the integrated controller 20 in one embodiment of the present invention. In the following, the configuration of the integrated controller 20 will be explained with reference to FIG. 3.

As shown in FIG. 3, the integrated controller 20 comprises a target drive torque calculating section 100, a mode selecting section 200, a target electric power generation output calculating section 300, an operating point command section 400, and a gear shift control section 500.

Figures 4A, 4B:
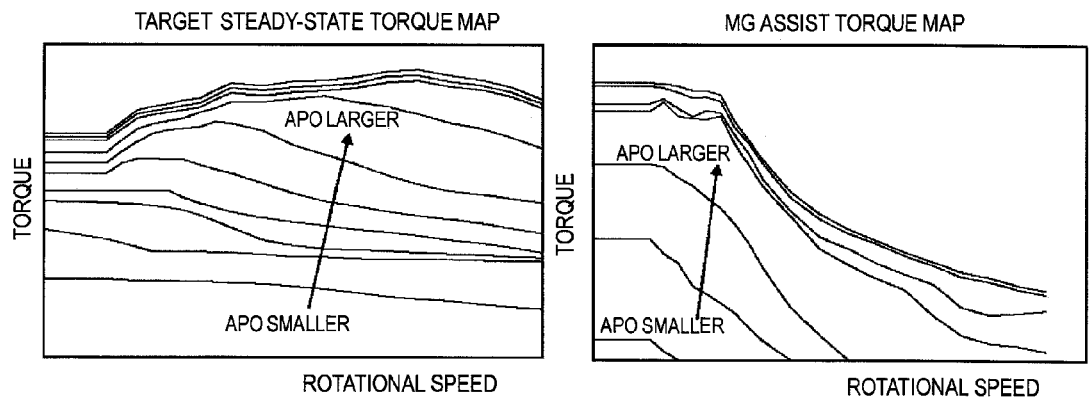
FIG. 4 is a map diagram including a target steady-state torque map (a) and an MG assisted torque map (b) utilized in the control system of one embodiment of the present invention.

The target drive torque calculating section 100 uses the target steady-state driving torque map shown in FIG. 4(a) and the MG assisted torque map shown in FIG. 4(b) to calculate the target steady-state driving torque and the MG assist torque from the accelerator position opening APO and the vehicle speed VSP.

Figure 5:
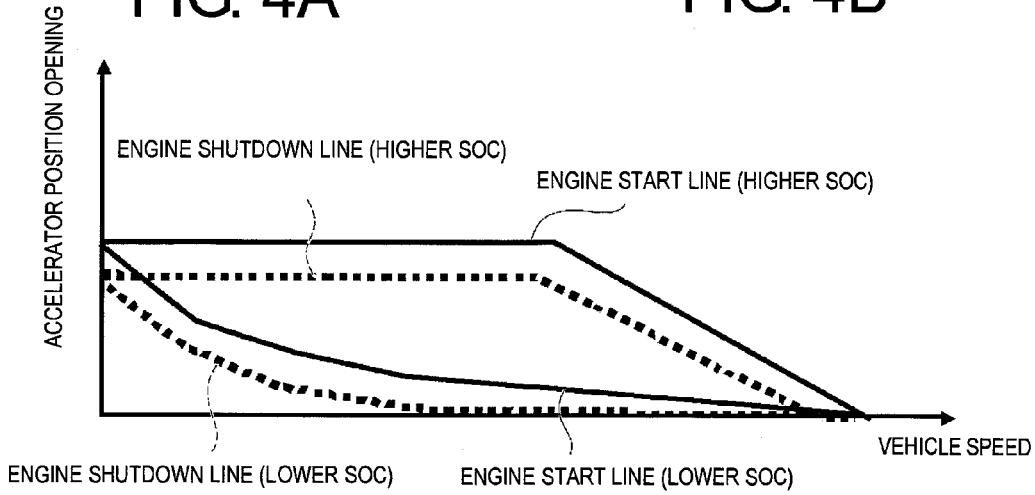
FIG. 5 is a map diagram illustrating the engine startup/shutdown line map utilized in the controller in one embodiment of the present invention.

The mode selecting section 200 uses the engine startup/shutdown line map set by the accelerator position at each vehicle speed shown in FIG. 5 to calculate the operation mode (HEV mode or EV mode). The engine startup line and the engine shutdown line are set as characteristics that have the accelerator position opening APO decrease to be smaller as the state of charge SOC decreases to be the typical characteristics of the engine startup line (high SOC, low SOC) and the engine shutdown line (high SOC, low SOC). Here, with the engine startup process, the torque capacity of the second clutch 5 is controlled so that the second clutch 5 is made to slip at the time when the engine startup line crosses the accelerator position opening APO as shown in FIG. 5 in the state when the "EV mode" is selected. Then, after a determination is made that slippage starts for the second clutch 5, the engagement of the first clutch 4 starts, and the engine rotation is increased. Once the engine rotational speed reaches the level where the initial ignition can take place, the engine 1 is turned on for combustion; when the motor rotational speed becomes close to the engine rotational speed, the first clutch 4 is fully engaged. Then, the second clutch 5 is locked up, and transition is made to the "HEV mode."

Figure 6:
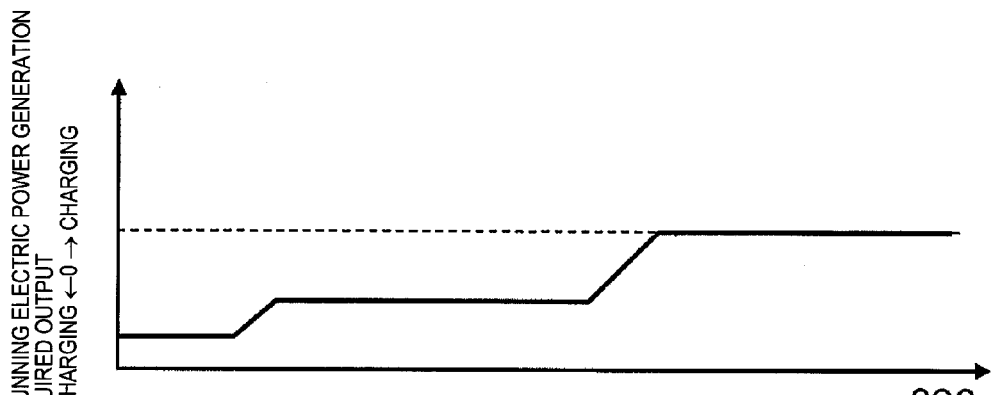
FIG. 6 is a diagram illustrating the characteristics of the electric power generation output required while the vehicle is running with respect to the state of charge SOC utilized in the controller of one embodiment of the present invention.
Figure 7:
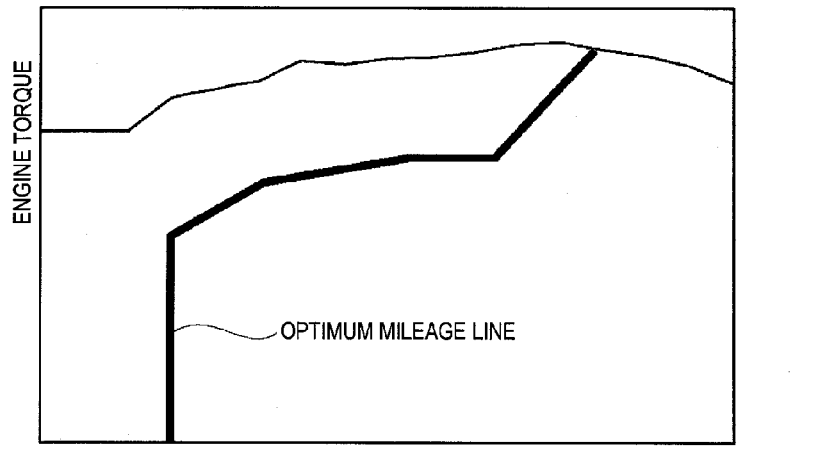
FIG. 7 is a diagram illustrating the characteristics of the optimum mileage line of the engine utilized in the controller of one embodiment of the present invention.

The target electric power generation output calculating section 300 uses the in-running electric power generation required output map shown in FIG. 6 to calculate the target electric power generation output from the state of charge SOC. Also, the output needed for increasing the engine torque from the current operating point to the optimum mileage line shown in FIG. 7 is calculated and compared to the target electric power generation output described above, and the lower output is added as the required output to the engine output.

The accelerator position opening APO, the target steady-state torque, the MG assist torque, the target mode, the vehicle speed VSP, and the required electric power generation output are input to the operating point command section 400 described above. Then, with this input information taken as the operating point arrival target, the transient target engine torque, the target MG torque, the target CL2 torque capacity, the target gear ratio, and the CL1 solenoid current command are calculated.

Figure 8:
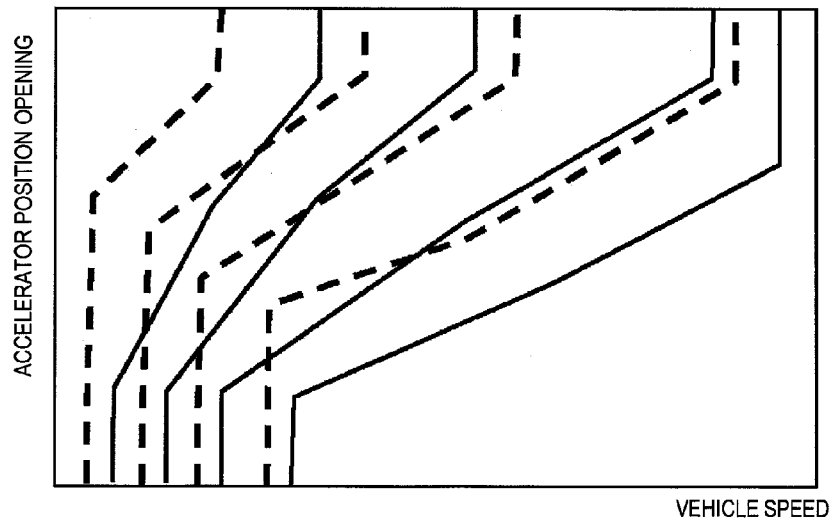
FIG. 8 is a space charge map diagram illustrating an example of the space charge line in the automatic transmission of one embodiment of the present invention.

Based on the target CL2 torque capacity and the target gear ratio, the gear shift control section 500 drives and controls the solenoid valves in the automatic transmission 3 so that the capacity and gear ratio are reached. FIG. 8 is a diagram illustrating an example of the gear shift line map utilized in the gear shift control. Based on the vehicle speed VSP and the accelerator position opening APO, a determination is made regarding the next gear shift step from the current gear shift step; if there is a request for the gear shift, the gear shift clutch is controlled to make the gear shift.

Figure 9:
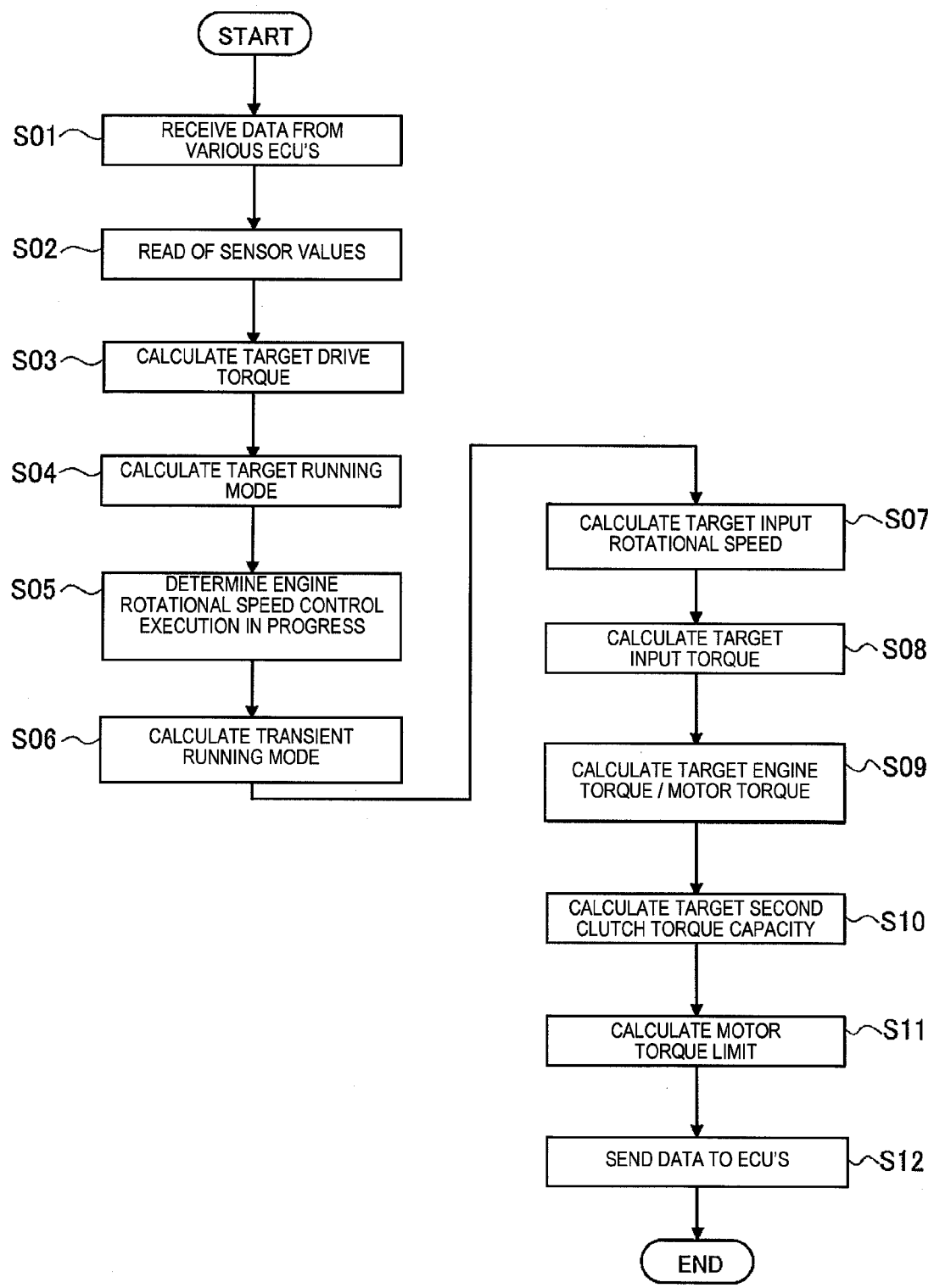
FIG. 9 is a flowchart illustrating the configuration and flow of the integrated control process executed in the integrated controller of one embodiment of the present invention.

FIG. 9 shows the configuration and the flow of the integrated control process carried out by the integrated controller 20 in one embodiment of the present invention. In the following, the various steps shown in FIG. 9 will be explained.

In step S01, the data are received from the various control apparatuses. Then, in the next step S02, the sensor value is read, and the information needed for the later control process is obtained.

In step S03, on the basis of the vehicle speed VSP, the accelerator position opening APO, and the brake hydraulic pressure BPS, the target drive torque is calculated corresponding to the brake force, and the process then goes to step S04.

Figure 10:
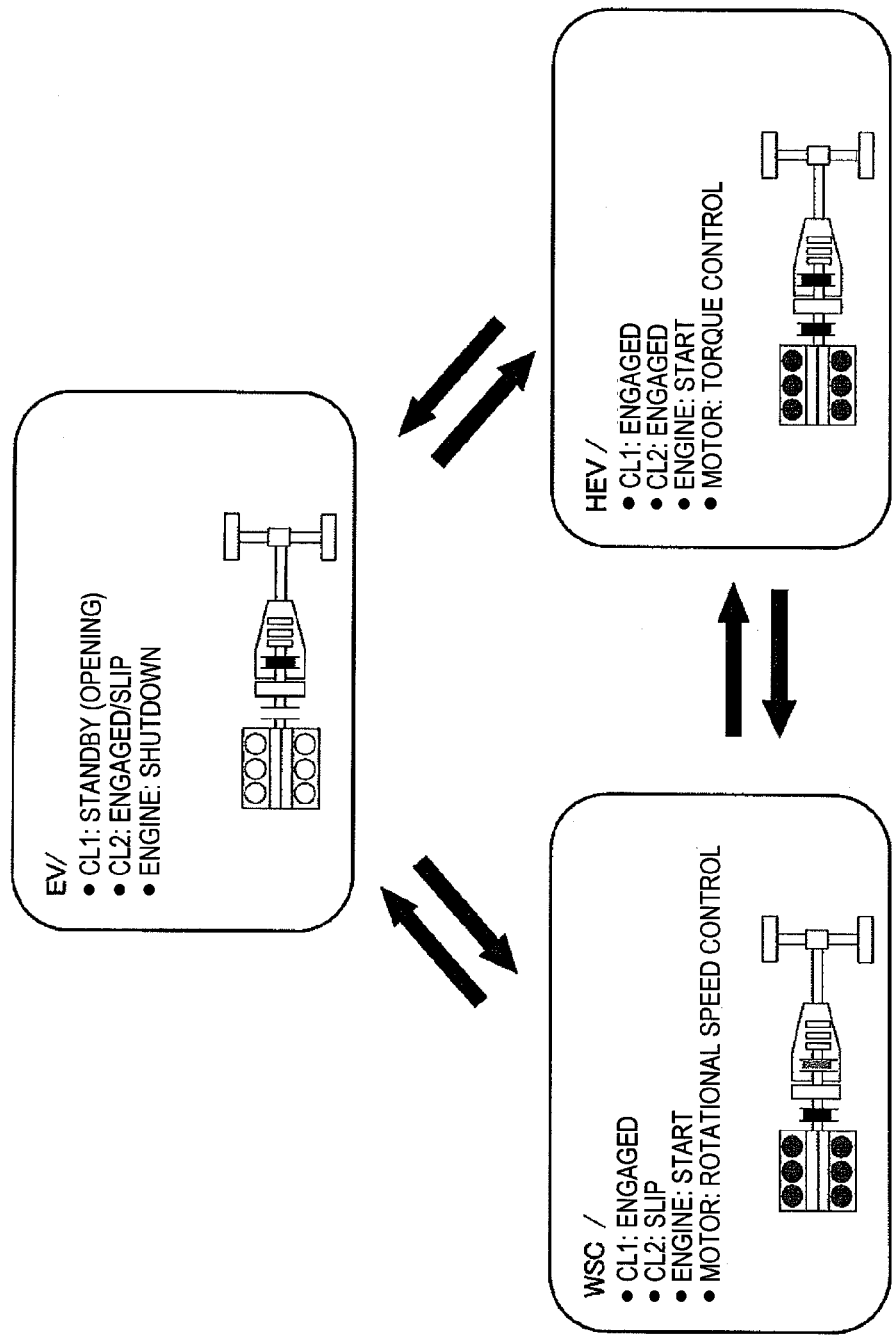
FIG. 10 is a diagram illustrating an example of the target running mode transition in the target running mode control process executed in step S04 shown in FIG. 9.

In step S04, as a continuation of calculating the target drive torque carried out in step S03, corresponding to the target drive torque, the state of charge SOC, the accelerator position opening APO, the vehicle speed VSP, the road slope, and other vehicle states, the target running mode is selected, and the process goes to step S05. As a reference, FIG. 10 shows an excerpt of the target running mode in which mutual transition takes place between the "EV mode," the "HEV mode," and the "WSC mode." Here, when the "WSC mode" is selected, basically, while the rotational speed control is carried out for the motor/generator 2, the second clutch 5 (CL2) is made to slip while the vehicle runs. Here, the "WSC mode" is included not only when the D range is selected but also when the P/N range is selected.

In step S05, as a continuation of the target running mode control process in step S04, a determination is made regarding whether the engine rotational speed control is carried out corresponding to the state of charge SOC, the battery temperature, other battery state parameters, the motor state where the restriction on the output of the motor inverter starts, the motor torque limit, the actual motor torque, other state parameters, the target running mode, the required drive torque, the vehicle speed, the gear shift step, and other running state parameters, and the process then goes to step S06. When the control state of the last round is the engine rotational speed control, as the control state is checked and found that the implementation time for carrying out the engine rotational speed control reaches a prescribed time and the deviation with respect to the target rotational speed is smaller than a prescribed value, the motor rotational speed control is selected.

In step S06, as a continuation of the engine rotational speed control execution determination control process in step S05, corresponding to the selection of the target running mode selected in step S04 and the engine rotational speed control selected in step S05, the transient running mode is selected, and the process goes to step S07. When the "WSC mode" is selected, the second clutch 5 (CL2) is made to slip, so that the input rotational speed control is carried out. However, usually, the input rotational speed is carried out by the motor/generator 2 with a high controllability. Also, in step S06, while running the vehicle with the "WSC mode" selected, when the engine rotational speed control is carried out, management is carried out for the transient state of switching from the motor rotational speed control to the engine rotational speed control and the control mode of the engine 1 and the motor/generator 2 (see FIG. 11).

In step S07, as a continuation of the transient running mode operation in step S06, when the "WSC mode" is selected in step S04, together with the control state (slip/engagement) of the second clutch 5 (CL2), the target input rotational speed is calculated, and the process then goes to step S08. Here, when the second clutch 5 (CL2) makes the transition from the slip to the engaged state, the target rotational speed is set so that the slip rotational speed angular acceleration is changed mildly, and the rotational speed variation torque (the moment of inertia x the slip rotational speed angular acceleration) generated in the engagement of the second clutch 5 (CL2) is decreased by setting the target rotational speed.

In step S08, as a continuation of the target input rotational speed calculating in step S07, the target input torque in consideration of the target drive torque and the various types of devices is calculated, and the process then goes to step S09.

In step S09, as a continuation of the target input torque calculating in step S08, the value obtained by adding the electric power generation torque in step S08 is provided as the engine torque, and the motor torque is calculated from the target input torque and the engine torque estimated value; the process then goes to step S10. In this case, without a decrease in the engine torque, the switch from the motor rotational speed control to the engine rotational speed control is carried out. In addition, after the transition to the engine rotational speed control, corresponding to the deviation of the rotational speed, the correction is carried out by the motor torque.

In step S10, as a continuation of the target engine torque/motor torque calculating in step S09, the target torque capacity of the second clutch 5 (CL2) is calculated, and the process then goes to step S11. Here, when the target running mode calculated in step S04 is the "WSC mode," the target torque capacity is calculated so that the clutch torque becomes the target drive torque.

In step S11, as a continuation of the target second-clutch torque capacity calculating in step S10, while the "WSC mode" is selected and the vehicle is running, the limit value in consideration of the torque margin of the rotational speed variation and the external disturbance correction is calculated, and the process then goes to step S12. In addition, when the engine rotational speed control is carried out in step S05, the motor torque limit is set corresponding to the transient control mode calculated in step S06.

In step S12, as a continuation of the motor torque limit calculating in step S11, the data are sent to each controller, and the then goes to the end.

Figure 11:
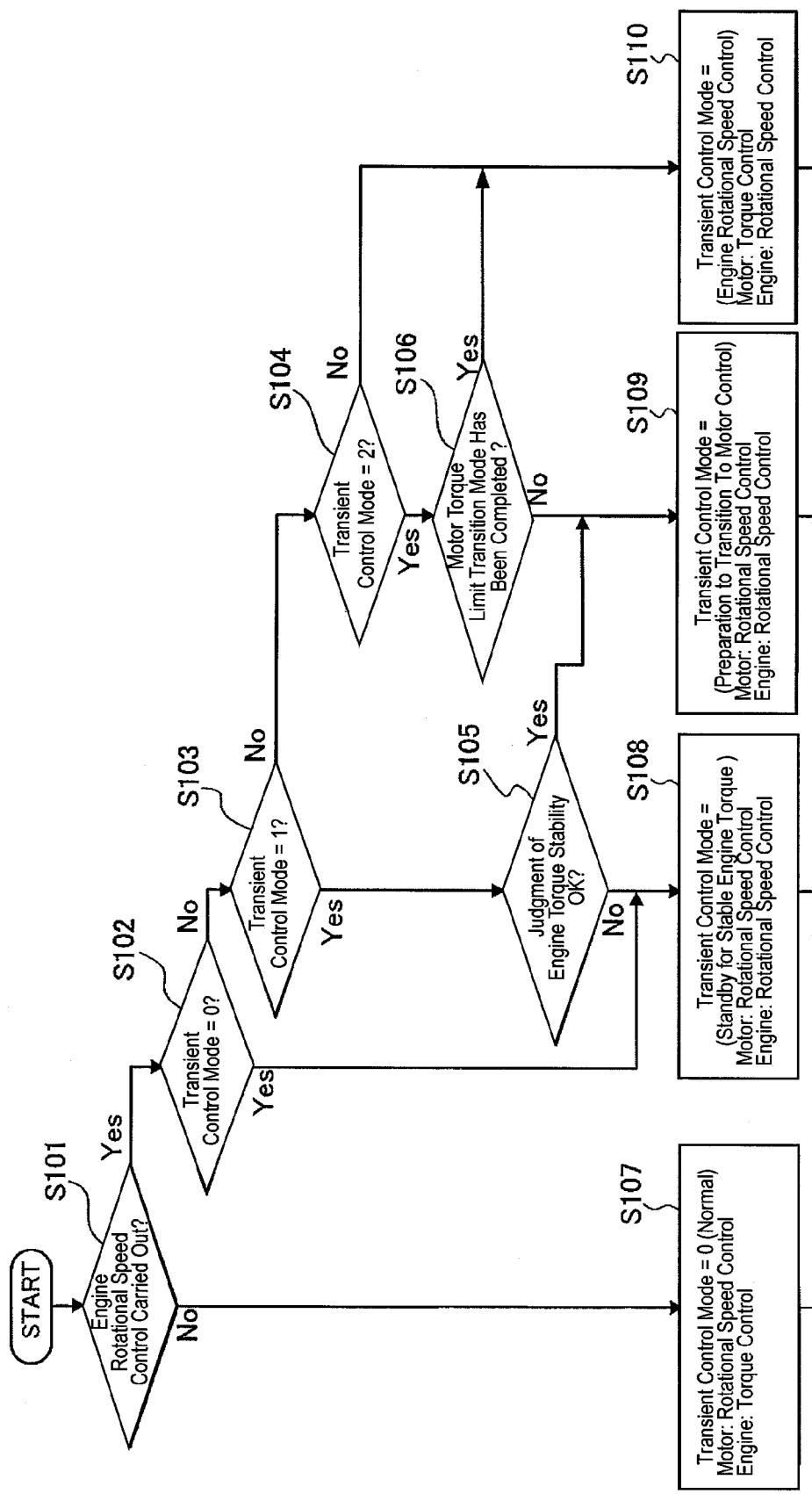
FIG. 11 is a flowchart illustrating the configuration and flow of the transient control mode switching control process executed in step S06 shown in FIG. 9 when the WSC mode is selected.

FIG. 11 shows the configuration and the flow of the transient control mode switching control process executed in step S06 shown in FIG. 9 when the WSC mode is selected (the figure shows the transient control mode switching control means). In the following, the various steps of the process shown in FIG. 11 will be explained.

In step S101, when the WSC mode is selected, a determination is made regarding whether the input rotational speed control of the second clutch 5 has the engine rotational speed control carried out in place of the motor rotational speed control. If the result of the determination is YES (i.e., the engine rotational speed control is carried out), the process goes to step S102. On the other hand, if the determination result is NO (i.e., the motor rotational speed control is maintained), the process goes to step S107.

In step S102, as a continuation of the determination regarding the execution of the engine rotational speed control in step S101, a determination is made regarding whether the transient control mode in the last round is the transient control mode equal to 0 (normal). If the determination result is YES (i.e., the transient control mode of the last round equals 0), the process goes to step S108; if the determination result is NO (i.e., the transient control mode of the last round does not equal 0), the process goes to step S103.

In step S103, as a continuation of the determination regarding the transient control mode does not equal 0 in step S102, a determination is made regarding whether the transient control mode of the last round has the transient control mode equal to 1 (wait for stable engine torque). If the determination result is YES (i.e., the transient control mode of the last round equals 1), the process goes to step S105. If the determination result is NO (i.e., the transient control mode of the last round does not equal 1), the process goes to step S104.

In step S104, as a continuation of the determination of the transient control mode not equal to 1 in step S103, a determination is made regarding whether the transient control mode of the last round is transient control mode equal to 2 (i.e., the preparation for motor control transition). If the determination result is YES (i.e., the transient control mode of the last round equals 2), the process goes to step S106. On the other hand, if the determination result is NO (i.e., the transient control mode of the last round does not equal 2), the process goes to step S110.

In step S105, as a continuation of the determination of the transient control mode equal to 1 in step S103, a judgment is made regarding whether the time lapsed from the time when the transient control mode equal to 1 reaches the preset time in consideration of the variation in the engine torque response to determine whether the engine torque is stable. If the determination result is YES (i.e., the judgment of the engine torque stability is OK), the process goes to step S109. On the other hand, if the determination result is NO (i.e., the judgment of the engine torque stability is NG), the process goes to step S108.

In step S106, as a continuation of the determination of the transient control mode equal to 2 in step S104, a judgment is made regarding whether the transition of the motor torque limit to the target motor torque has ended. If the determination result is YES (i.e., the motor torque limit transition mode has been completed), the process goes to step S110. On the other hand, if the determination result is NO (i.e., the motor torque limit transition mode has not been completed), the process goes to step S109. Here, as the motor torque limits, there are the upper torque limit and the lower torque limit. Whether the transition of the upper torque limit to the target upper torque limit (equal to 0) has ended is checked, and whether the transition of the lower torque limit to the target lower torque limit in the motor torque control (equal to the electric power generation torque) has ended is also checked.

In step S107, as a continuation of the determination of maintaining the motor rotational speed control in step S101, the transient control mode equal to 0 (normal) is set by the motor rotational speed control and the engine torque control, and the process goes to the end.

In step S108, as a continuation of the determination of the transient control mode of the last round equal to 0 in step S102 or the determination of the result of NG for the engine torque stability determination in step S105, the transient control mode equal to 1 (standby for stable engine torque) is set by the motor rotational speed control and the engine rotational speed control, and the process goes to the end.

In step S109, as a continuation of the determination of OK of the stability of the engine torque in step S105 or the determination that the motor torque limit transition has not ended in step S106, the transient control mode equal to 2 (the preparation for the motor control transition) is set by the motor rotational speed control and the engine rotational speed control, and the process then goes to the end. Here, if the result of the determination of the engine torque stability is OK, and the transient control mode equal to 2, the motor lower torque limit in the motor rotational speed control is gradually changed to the electric power generation torque, and then the mode is switched to the motor torque control.

In step S110, as a continuation of the determination that the transient control mode of the last round does not equal 2 in step S104 or the determination that the motor torque limit transition has not ended in step S106, the transient control mode equal to 3 (the engine rotational speed control) is set by the motor torque control and the engine rotational speed control, and the process then goes to the end. Here, the electric power generation torque at the transient control mode equal to 3 is calculated in consideration of the torque corresponding to the prescribed correction quantity when the rotational speed varies with respect to the motor lower torque limit. Also, after switching to the engine rotational speed control, the rotational speed control is carried out for the engine 1 in a performance guaranteed range of the rotational speed control by the engine 1, and the rotational speed control is carried out by the motor/generator 2 for the deviation in the rotational speed over the performance guaranteed range. In addition, without a decrease in the engine torque, the switch is carried out from the motor rotational speed control to the engine rotational speed control. In addition, when the switch is carried out from the engine rotational speed control to the motor rotational speed control, the switch is carried out after confirming that the time for carrying out the engine rotational speed control reaches a prescribed time and the deviation with respect to the target rotational speed becomes a prescribed value or smaller.

In the following, the operation will be explained. First, the "object of the comparative example" will be explained. Then, the operation of the hybrid vehicle control device in one embodiment of the present invention will be explained by dividing the explanation into the following subjects: "the operation of the transient control mode switching control process," "the operation of the transient control mode switching," and "the operation of each transient control mode."

Figure 12:
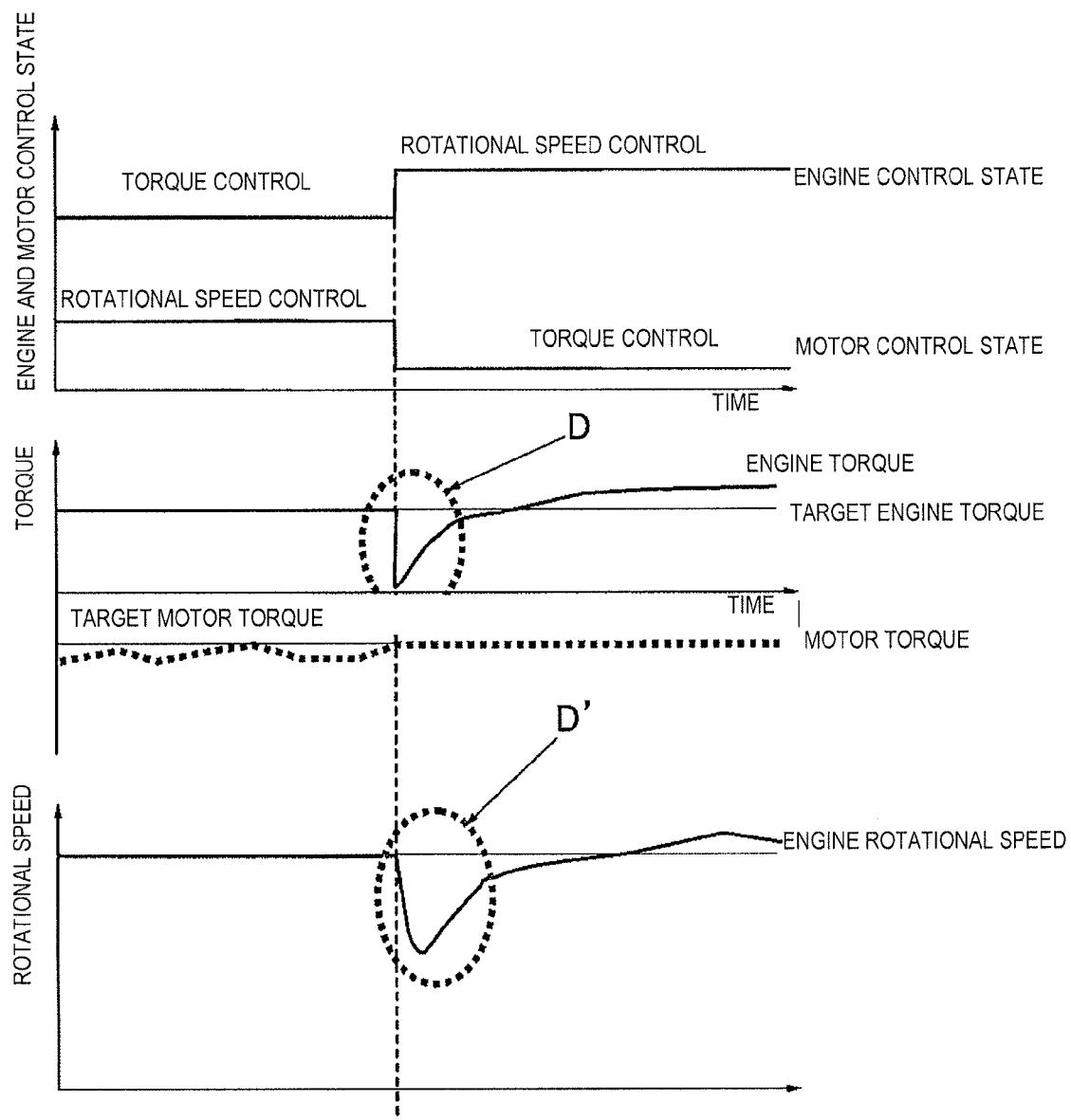
FIG. 12 is a time chart illustrating the various characteristics of the engine control state, the motor control state, the target engine torque, the engine torque, the target motor torque, the motor torque, and the engine rotational speed when the switch is made from the motor rotational speed control to the engine rotational speed control in a comparative example.

The object of the comparative example will now be explained. When the WSC mode is selected, as the input rotational speed control of the start clutch is switched from the motor rotational speed control to the engine rotational speed control, the operation when switching to the engine rotational speed control and the switching to the motor torque control out at the same time is taken as the comparative example (FIG. 12).

For example, when there is a limit in the motor and the battery, continuing the motor rotational speed control is impossible. Consequently, it is necessary to carry out the rotational speed control by the engine instead of the motor rotational speed control. However, in the normal engine torque control and the engine rotational speed control, for the engine, the ignition timing and the throttle position are switched. Consequently, as indicated by the arrow D shown in FIG. 12, instead of tracking the target value for the transient engine torque, torque sliding takes place, that is, the engine torque instantly disappears. Then, as indicated by the arrow D' in FIG. 12, due to the torque sliding of the engine, the engine rotational speed decreases. This portion also takes place when the N range is selected.

The decrease in the engine rotational speed becomes significant when the motor electric power generation is carried out. As the engine rotational speed decreases, floor vibration may take place as the engine stalls or the passage of the engine resonance zone takes place. In addition, in a system free of the torque converter, such as in the system of one embodiment of the present invention, even when there is a responsiveness of the engine rotational speed control the same as that of the engine vehicle, maintaining the engine rotational speed (equal to the clutch input rotational speed) is difficult when, for example, an external disturbance is applied due to the start clutch as switching is carried out from the motor rotational speed control to the engine rotational speed control.

Operation of the transient control mode switching control process will now be explained. When the WSC mode is selected, as the input rotational speed of the second clutch 5 (CL2) is controlled by the motor rotational speed control, in the flow chart shown in FIG. 11, the following flow of operation is carried out repeatedly: step S101→step S107→END. In this case, as described in the time zone until the time t1 shown in FIG. 13, in step S107, the transient control mode equal to 0 (normal) is set by the motor rotational speed control and the engine torque control.

Figure 13:
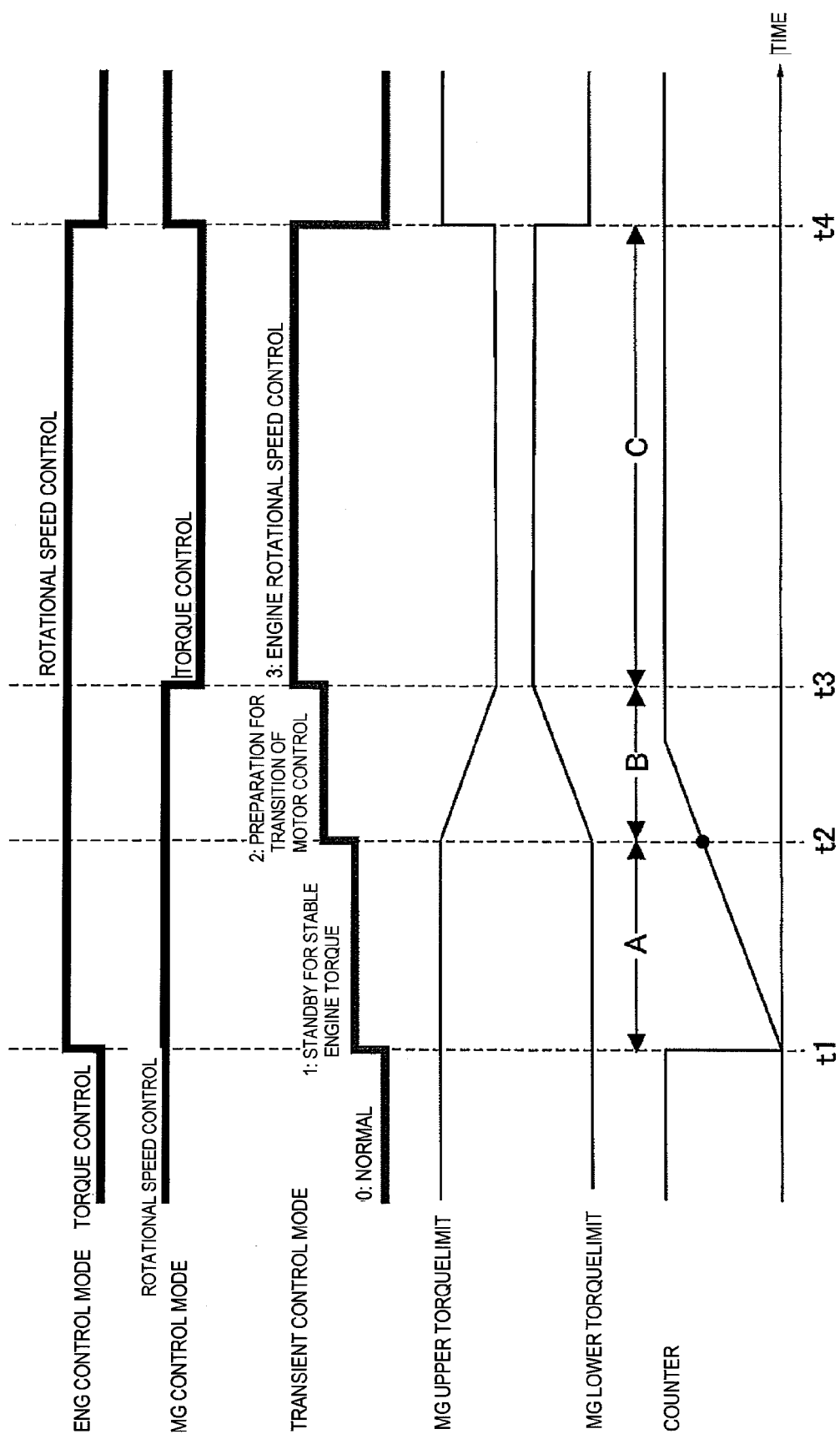
FIG. 13 is a time chart having the transient control mode switching control process in one embodiment of the present invention as the time axis.

Then, for example, when it is necessary to carry out the rotational speed control by the engine 1 instead of the motor rotational speed control due to the fact that the motor rotational speed control cannot be continued, in the flow chart shown in FIG. 11, the following flow of operation is carried out: step S101→step S102→step S108→END. In this case, in step S108, the transient control mode equal to 1 (standby for the stable engine torque) is set by the motor rotational speed control and the engine rotational speed control. Then, from the next round, in the flow chart shown in FIG. 11, the following flow of operation is carried out repeatedly: step S101→step S102→step S103→step S105→step S108→END. That is, as shown in FIG. 13, in the period from the time t1 to the time t2 in step S105, when the result of the determination of the engine torque stability is OK, the setting of the transient control mode equal to 1 (standby for the stable engine torque) is maintained.

Then, as a determination is made that the engine torque stability is OK, as shown in the flow chart of FIG. 11, the following flow of operation is carried out: step S101→step S102→step S103→step S105→step S109→END. In this case, in step S109, the transient control mode equal to 2 (the preparation for the motor control transition) is set by the motor rotational speed control and the engine rotational speed control. For the next round, in the flow chart shown in FIG. 11, the following flow of operation is carried out: step S101→step S102→step S103→step S104→step S106→step S109→END. That is, as shown in FIG. 13, in the period from the time t2 to the time t3 in step S106, when a determination is made that the motor torque limit transition has ended, the setting of the transient control mode equal to 2 (the preparation for the motor control transition) is maintained.

Then, when a determination is made that the motor torque limit transition has ended, in the flow chart shown in FIG. 11, the following flow of operation is carried out: step S101→step S102→step S103→step S104→step S106→step S110→END. In this case, in step S110, the transient control mode equal to 3 (the engine rotational speed control) is set by the motor torque control and the engine rotational speed control. For the next round, in the flow chart shown in FIG. 11, the following flow of operation is carried out repeatedly: step S101→step S102→step S103→step S104→step S110→END. That is, as shown in FIG. 13, in the period from the time t3 to the time t4 when the control once again returns to the motor rotational speed control, the setting of the transient control mode equal to 3 (the engine rotational speed control) is maintained.

Transient control mode switching operation will now be explained. As explained above, when the input rotational speed control of the second clutch 5 (CL2) is switched from the motor rotational speed control to the engine rotational speed control, as shown in FIG. 13, the motor rotational speed control is maintained at least until the time t2 when a determination is made that the engine torque is stable, and the motor rotational speed control and the engine rotational speed control are carried out at the same time in this case. Then, at the time t3 when a determination is made that the engine torque is stable and the transition of the motor torque limit has ended, the motor rotational speed control is switched to the motor torque control.

In this way, when the motor rotational speed control is switched to the engine rotational speed control, at least in the switching start zone (the time zone indicated by A in FIG. 13), the motor rotational speed control and the engine rotational speed control are carried out while overlapping with each other (arrow E in FIG. 14).

As the motor rotational speed control and the engine rotational speed control are carried out at the same time, when the engine 1 is switched from the torque control to the rotational speed control, the engine transient response that no engine torque is output in a transient way is compensated by the motor rotational speed control. That is, the following effect is realized: the target motor rotational speed is maintained while no motor torque is output so that a variation in the engine torque is suppressed by the motor rotational speed control.

Consequently, due to the function of compensation for the engine transient response by the motor rotational speed control, the variation in the engine rotational speed (equal to the clutch input rotational speed) is suppressed as indicated by the arrow G shown in FIG. 14. As a result, when the input rotational speed control of the second clutch 5 (CL2) is switched from the motor rotational speed control to the engine rotational speed control, while the variation in the clutch input rotational speed is suppressed, it is possible to realize the motor electric power generation in the allowed range after switching to the motor torque control.

Operation of control in each transient control mode will now be explained. As explained above, in the time zone of the transient control mode 1 (standby for the stable engine torque) indicated by A in FIG. 13, as the switch is made from the motor rotational speed control to the engine rotational speed control, it is possible to realize the target suppression of the variation in the clutch input rotational speed. That is, in the time zone indicated by A in FIG. 13, management is carried out in consideration of the variation in the engine torque response, and management stands by for the time when the result of the determination of the engine torque stability becomes ON. As indicated by the counter characteristics in FIG. 13, in this standby time, the counter is initialized when the transient control mode changes from 0 (normal)→1 (standby for the stable engine torque); after the lapse of a preset prescribed time, the engine torque determination turns ON as a result.

On the other hand, the time zone of the transient control mode 2 (the preparation for the motor control transition) indicated by B in FIG. 13 is set for realizing the target suppression of the variation in the motor torque at the time of switching from the motor rotational speed control to the motor torque control. That is, in the time zone indicated by B in FIG. 13 corresponding to the confirmation that the transition of the upper torque limit to the target upper torque limit (equal to 0) has ended, the transition of the lower torque limit to the target lower torque limit (equal to the electric power generation torque) in the motor torque control has ended. As a result, as indicated by the arrow F shown in FIG. 14, variation in the motor torque is suppressed in the region of switching from the motor rotational speed control to the motor torque control.

The time zone of the next transient control mode 3 (the engine rotational speed control) is set for realizing the target of switching the motor/generator 2 from the rotational speed control to the torque control to guarantee the electric power generation while keeping the motor lower torque limit. That is, in the time zone indicated by C in FIG. 13, when a determination is made that the transition of the motor lower torque limit to the electric power generation torque has been ended before the time zone described above, control is carried out so that the motor torque is made to be in agreement with the motor lower torque limit. As a result, as shown in the torque characteristics in FIG. 14, the motor torque becomes that along the motor lower torque limit (the target motor torque), and it is possible to carry out stable electric power generation by the motor/generator 2.

In the following, the effects will be explained. For the hybrid vehicle control device in one embodiment of the present invention, the following listed effects can be realized.

(1) The hybrid vehicle control device has an engine 1, a motor/generator 2 that is connected to the engine 1 and carries out power driving and electric power regeneration, a start clutch (the second clutch 5) that is arranged in the drive force transmission system from the motor/generator 2 to the drive wheels (the wheels 7 and 7) and is engaged under the input rotational speed control, and a transient control mode switching means (FIG. 11) that works as follows: when the input rotational speed control of the start clutch (the second clutch 5) is switched from the motor rotational speed control to the engine rotational speed control, the motor rotational speed control is maintained, and both the motor rotational speed control and the engine rotational speed control are carried out at the same time until a determination is made that the engine torque is stable; after the determination has been made that the engine torque is stable, the control is switched from the motor rotational speed control to the motor torque control. Consequently, when the input rotational speed control of the start clutch (the second clutch 5) is switched from the motor rotational speed control to the engine rotational speed control, it is possible to realize the motor electric power generation in the allowed range while the variation in the clutch input rotational speed is suppressed.

(2) With the transient control mode switching means (FIG. 11), when a determination is made that the engine torque is stable, the motor lower torque limit in the motor rotational speed control is gradually changed to the electric power generation, followed by switching to the motor torque control (step S109). Consequently, in addition to the effect of (1), it is possible to suppress the variation in the motor torque when the switch is made from the motor rotational speed control to the motor torque control while guaranteeing the desired electric power generation quantity.

(3) The transient control mode switching means (FIG. 11) determines the stability of the engine torque by the lapse of a preset time in consideration of the variation in the engine torque response (step S105). Consequently, in addition to the effects of (1) and (2), by time management, a simple control operation, it is possible to make a highly precise determination of the stability of the engine torque.

(4) The transient control mode switching means (FIG. 11) calculates the electric power generation torque in consideration of the torque corresponding to the prescribed correction quantity for the variation in the rotational speed with respect to the motor upper torque limit and the motor lower torque limit (step S110). Consequently, in addition to the effects of (2) and (3), by leaving the motor torque to switch from the motor rotational speed control to the engine rotational speed control, it is possible to suppress the variation in the clutch input rotational speed when the switch is made from the motor rotational speed control to the engine rotational speed control.

(5) After switching to the engine rotational speed control, the transient control mode switching means (FIG. 11) carries out the rotational speed control for the engine 1 within the performance guaranteed range of the rotational speed control by the engine 1, and the transient control mode switching means carries out the rotational speed control for the motor/generator 2 for the deviation in the rotational speed over the performance guaranteed range (step S110). Consequently, in addition to the effects of (3) and (4), in the engine rotational speed control, while it is possible to realize the desired electric power generation quantity, preventing a decrease in the clutch input rotational speed is also possible.

(6) Without a decrease in the engine torque, the transient control mode switching means (FIG. 11) switches from the motor rotational speed control to the engine rotational speed control (step S110). Consequently, in addition to the effects of (1) through (5), when the switch is made from the motor rotational speed control to the engine rotational speed control, there is no decrease in the electric power generation quantity, so that it is possible to suppress the decrease in the switching time and the decrease in the electric power generation quantity.

(7) When the switch is made from the engine rotational speed control to the motor rotational speed control, the transient control mode switching means (FIG. 11) makes the determination according to the fact that the time for carrying out the engine rotational speed control reaches the prescribed time and that the deviation with respect to target rotational speed becomes a prescribed value or smaller (step S110). Consequently, in addition to the effects of (1) through (6), by preventing the switching hunting from the engine rotational speed control to the motor rotational speed control, it is possible to prevent the feeling of discomfort for the driver.

In the above, the hybrid vehicle control device of the present invention has been explained with reference to one embodiment of the present invention. However, the specific configuration is not limited to one embodiment of the present invention. As long as the main points of the present invention related to the various claims of the present patent application are observed, changes in the design, additions to the design, etc. can be made.

In one embodiment of the present invention, an example in which the control state (slip/engagement) of the second clutch 5 (the start clutch) is controlled by the input rotational speed control is presented. However, the present invention also can be utilized as the case in which the start clutch is fully engaged by the input rotational speed control.

In one embodiment of the present invention, an example in which the determination of the engine torque stability is carried out by time management is presented. However, the following schemes may also be utilized. That is, as indicated by the arrow F in FIG. 14, when the state in which the deviation between the target motor torque and the motor torque is within a prescribed value is determined to be held continuously for a prescribed time, the result of the determination of the engine torque stability is taken to be OK. In addition, the following scheme may also be utilized: when both the time condition of one embodiment of the present invention and the motor torque deviation convergence condition are met, the result of the determination of the engine torque stability is taken to be OK.

In one embodiment of the present invention, as the transient control mode switching means, the following example is presented: when a determination is made that the engine torque is stable, after the lapse of time t2 through time t3, the MG control mode is switched from the rotational speed control to the torque control (FIG. 13). However, the following scheme may be also utilized for the transient control mode switching means: when a determination is made that the engine torque is stable, right after the stability is determined (time t2), the MG control mode is switched from the rotational speed control to the torque control.

In one embodiment of the present invention, as an example, the invention is utilized on a hybrid vehicle having a 1-motor/2-clutch type power train system with the first clutch inclined between the engine and the motor/generator. However, the present invention may also be utilized in the hybrid vehicle having a power train system in which the engine and the motor/generator are directly connected to each other. Here, the present invention can be applied to front-wheel drive vehicles, rear-wheel drive vehicles and 4-wheel drive vehicles as long as the vehicle is a hybrid vehicle having a start clutch at a position downstream from the engine and the motor/generator.

The invention claimed is:

1. A hybrid vehicle control system comprising:
   an engine;
   a motor/generator connected to the engine to carry out power driving and electric power regeneration;
   a start clutch arranged in a driving force transmission path from the motor/generator to a drive wheel, and engaged under an input rotational speed control; and
   a controller including a transient control mode switching section that when the input rotational speed control of the start clutch is switched from motor rotational speed control to engine rotational speed control, the motor rotational speed control is maintained on and both the motor rotational speed control and the engine rotational speed control are carried out at the same time until a determination is made that an engine torque is stable, and, after the determination is made that the engine torque is stable, the control switches from the motor rotational speed control to a motor torque control.

2. The hybrid vehicle control system according to claim 1, wherein
   the transient control mode switching section determines a stability of the engine torque by lapse of a preset time in consideration of a variation in engine torque response.

3. The hybrid vehicle control device according to claim 2, wherein
   the transient control mode switching section calculates an electric power generation torque in consideration of the torque corresponding to a prescribed correction quantity for a variation in motor rotational speed with respect to a motor upper torque limit and a motor lower torque limit.

4. The hybrid vehicle control system according to claim 3, wherein
   after switching to the engine rotational speed control, the transient control mode switching section carries out the engine rotational speed control within an engine rotational speed range free of generating an engine stall, and carries out the motor rotational speed control for the motor/generator for a rotation deviation in the rotational speed over the engine rotational speed range.

5. The hybrid vehicle control system according to claim 3, wherein
   the transient control mode switching section switches from the motor rotational speed control to the engine rotational speed control without decreasing the engine torque.

6. The hybrid vehicle control system according to claim 3, wherein
   when switching from the engine rotational speed control to the motor rotational speed control, the transient control mode switching section determines such that an implementation time for carrying out the engine rotational speed control reaches a prescribed time and such that a deviation with respect to a target rotational speed becomes a prescribed value or smaller.

7. The hybrid vehicle control system according to claim 2, wherein
   after switching to the engine rotational speed control, the transient control mode switching section carries out the engine rotational speed control within an engine rotational speed range free of generating an engine stall, and the transient control mode switching section carries out the motor rotational speed control for the motor/generator for a rotation deviation in the rotational speed over the engine rotational speed range.

8. The hybrid vehicle control system according to claim 7, wherein
the transient control mode switching section switches from the motor rotational speed control to the engine rotational speed control without decreasing the engine torque.

9. The hybrid vehicle control system according to claim 7, wherein
when switching from the engine rotational speed control to the motor rotational speed control, the transient control mode switching section determines such that an implementation time for carrying out the engine rotational speed control reaches a prescribed time and such that a deviation with respect to a target rotational speed becomes a prescribed value or smaller.

10. The hybrid vehicle control system according to claim 2, wherein
the transient control mode switching section switches from the motor rotational speed control to the engine rotational speed control without decreasing the engine torque.

11. The hybrid vehicle control system according to claim 2, wherein
when switching from the engine rotational speed control to the motor rotational speed control, the transient control mode switching section determines such that an implementation time for carrying out the engine rotational speed control reaches a prescribed time and such that a deviation with respect to a target rotational speed becomes a prescribed value or smaller.

12. The hybrid vehicle control system according to claim 1, wherein
the transient control mode switching section switches from the motor rotational speed control to the engine rotational speed control without decreasing the engine torque.

13. The hybrid vehicle control system according to claim 12, wherein
when switching from the engine rotational speed control to the motor rotational speed control, the transient control mode switching section determines such that an implementation time for carrying out the engine rotational speed control reaches a prescribed time and such that a deviation with respect to a target rotational speed becomes a prescribed value or smaller.

14. The hybrid vehicle control system according to claim 1, wherein
when switching from the engine rotational speed control to the motor rotational speed control, the transient control mode switching section determines such that an implementation time for carrying out the engine rotational speed control reaches a prescribed time and such that a deviation with respect to a target rotational speed becomes a prescribed value or smaller.

* * * * *